No. 752,006.

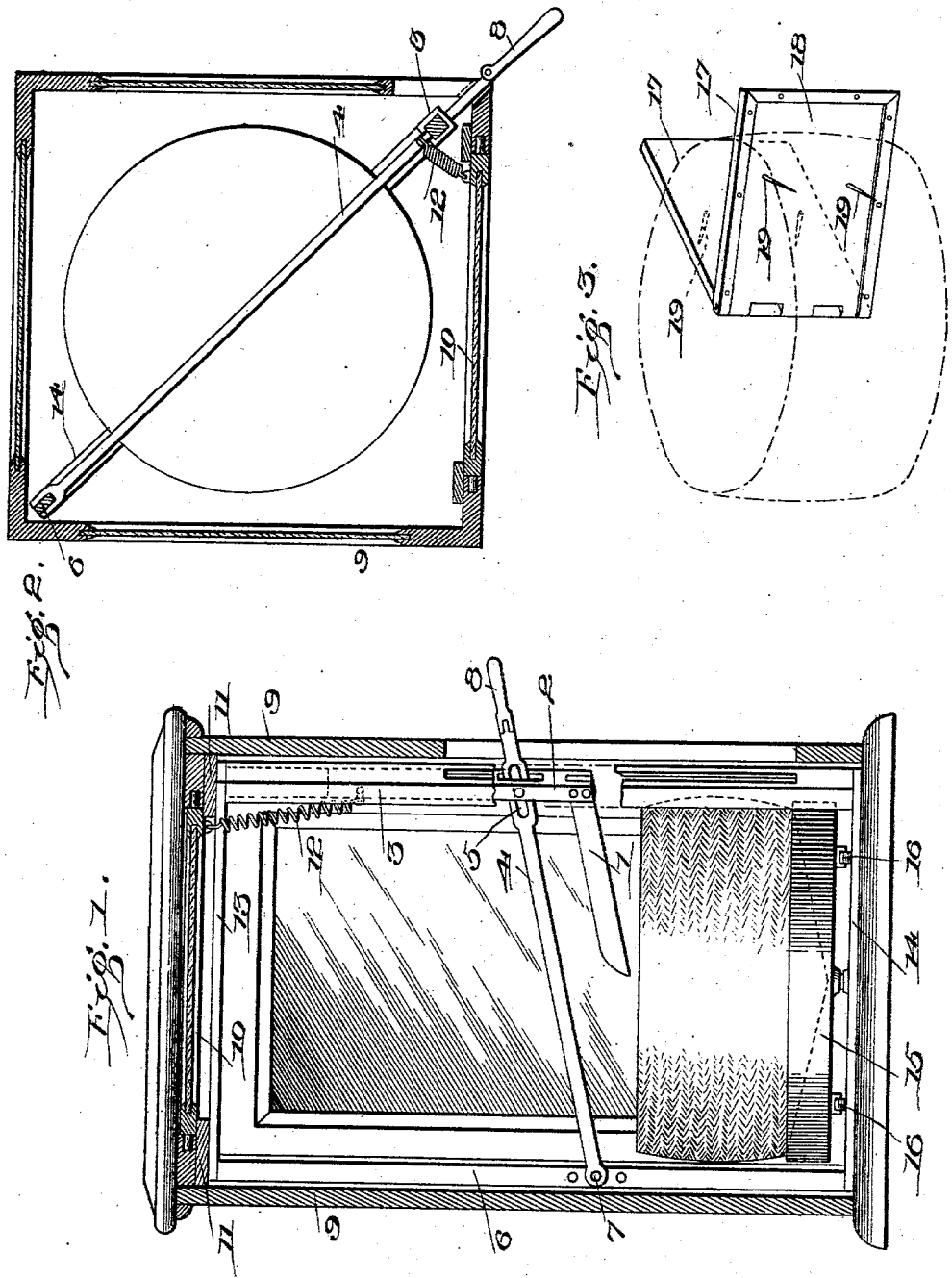

Patented February 9, 1904.

UNITED STATES PATENT OFFICE.

ORSON W. SMITH, OF CHARLEVOIX, MICHIGAN, ASSIGNOR TO HIMSELF AND JOHN J. FAGAN, OF CHARLEVOIX, MICHIGAN.

CHEESE-CUTTER.

SPECIFICATION forming part of Letters Patent No. 752,006, dated February 9, 1904.

Application filed May 1, 1903. Serial No. 155,103. (No model.)

*To all whom it may concern:*

Be it known that I, ORSON W. SMITH, a citizen of the United States, and a resident of Charlevoix, in the county of Charlevoix and State of Michigan, have invented certain new and useful Improvements in Cheese-Cutters, of which the following is a specification.

My invention relates to an improvement in cheese-cutters of that character in which the cheese is placed beneath a knife which is so mounted as to be guided in a certain path, said means being actuated by means of a lever or other equivalent mechanism.

The object of my invention is to provide an improved device of this character in which the knife is held in a position so that one end thereof enters the cheese first, the cut being a slightly-shearing cut, and therefore requiring less power to cut through the rind of the cheese than if the whole length of the knife were brought into contact at once.

Another object of my invention is to produce a device which shall more readily and perfectly cut the cheese than the usual device and one in which the parts shall be so designed as to render the operation of putting in and cutting the cheese more convenient than ordinary.

Further objects of my invention will be seen by reference to the claims.

In the drawings, Figure 1 is an elevation of my device, the casing surrounding the same being shown in section. Fig. 2 is a plan view of the device, the casing being shown in horizontal section. Fig. 3 is a perspective view showing the cheese after having been cut and with the protector in place.

Corresponding parts in all the figures are denoted by the same reference characters.

With cheese-cutters as ordinarily constructed the knife is brought into contact with the cheese in such a position that the edge thereof contacts with the upper surface of the cheese throughout its length at the same time. As the rind or outer skin of the cheese is the most difficult to cut, both because the outer layer of the cheese is harder and because it is covered with a layer of cloth, this position of knife requires the exertion of considerable power to cause it to enter the cheese. With my device the knife is placed at an angle such that its point enters the cheese first, and as the knife descends it gradually cuts through the rind from the center toward the outside, so that only a small portion is being cut at any given instant. This is clearly shown in Fig. 1. In this, 1 represents a knife, which is fixedly secured to a sliding bar 2, said bar moving within vertical guides 3. The bar 2, which carries the knife, may be reciprocated by any suitable means. The means herein shown consists of a lever 4, which is pivoted at one end to any convenient support. The support herein shown consists of a standard or post 6, rising from the base of the device and provided with a pin 7, which passes through the standard and the lever 4, said standard being provided with more than one pin-receiving hole, so that the point of attachment of the lever may be vertically adjusted.

The means of connecting the lever 4 to the bar 2 consists of a slot 5, which engages a pin carried by the bar 2. I preferably make the outer end 8 of the lever 4 of a separate piece and connect the two by means of a pivot which lies substantially in a vertical position, so that when not in use the outer projecting end 8 may be swung around and back against the side of the lever 4, thus getting it out of the way and permitting the surrounding casing to be closed.

I prefer to surround the operating parts of my device, together with the cheese therein, by a casing which shall protect it from dust and atmospheric influences. I have shown such a casing 9, to which the guide 3 for the reciprocating bar 2 may be attached. The side of this casing on which the cutting of the cheese is to done is provided with a door 10, said door being mounted in guides, so that it may be raised, and when in its uppermost position is capable of being swung upward upon an axis near its upper end and then pushed backward upon guides 11. This door is connected with the reciprocating bar 2 by means of a spring 12, so that when the door is in its uppermost position the knife is supported by said spring and held so that the knife may be depressed for cutting the cheese.

I prefer to use a construction in which the post or standard 6, upon which the cutting-lever is pivoted, shall be connected by its upper end with the upper portion or an extension of the guide 3 by a cross brace or bar 13 and in which also the lower ends of the same bar are connected by a similar cross-bar 14. This construction stiffens and braces the two members 3 and 6, so that the movement of the knife is more accurate and there is less racking of the parts.

Preferably the support for the cheese consists of a board 15, which is mounted so that it may readily be turned and shifted about. This result is secured by means which, as herein shown, consists of rollers 16, secured to the bottom of the board 15 and upon which it is supported. These rollers will permit the board to be turned as upon an axis. This board is also preferably concaved on its upper surface, the angle of the sides of the concavity substantially corresponding with the angle of the cutting edge of the knife. As the point of the knife enters the top of the cheese first, the point of the knife will come out of the bottom of the cheese first, and it is therefore necessary to provide means whereby the knife may pass down a sufficient distance, so as to cut to the outer extremity of the cheese.

After the cheese has been cut the cut surfaces will quickly dry out, in which condition the outer layer of the cheese is not as desirable as if it were moist. To prevent such drying action, I provide a protector, which is shown in perspective in Fig. 3. This protector consists of two plate-like members hinged together at one edge and provided with a coating or surfacing material which is adapted to prevent evaporation. A convenient material for such a purpose is a layer of felt, which may be moistened or saturated with water or oil or any other material which will accomplish the desired result. As shown, this protector consists of two plates 17, of sheet metal, hinged together at one edge and upon adjacent sides of both sheets provided with a layer 18, of felt. This felt layer is bound about its edges and held in place by having the edge of the sheet metal rolled or flanged over the same. It may, however, be secured by pins, rivets, cement, or in any other suitable manner. In use this protector is inserted into the angle between the two cut surfaces of the cheese as soon as the opening is large enough to receive it. As the angle increases by cutting off portions of the cheese the two sides of the protector are gradually opened out and may be made to contact with the cut surfaces until the cheese is entirely cut up. This protector may also be provided with pins, as 19, which are adapted to enter the cheese and hold the protector in place.

I do not desire to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variation and modification as properly fall within the scope of my invention and the terms of the following claims.

Having thus described my invention, I claim and desire to secure by Letters Patent—

1. In a cheese-cutter, the combination with a case having a door adapted to be raised to give access to the cheese, of a knife, means for vertically reciprocating the knife and a spring connecting said door and knife and adapted to raise the knife.

2. In a cheese-cutter in combination, a casing having a door adapted to slide upward and turn into a horizontal position, a cutter and means for reciprocating it in a fixed path and a spring connecting said door and cutter.

3. In a cheese-cutter, a casing therefor provided with a door, a knife within the casing, and a connection between the door and knife whereby the opening of the former will effect the raising of the latter into operative position.

4. A cheese-cutter, comprising a support for the cheese, a post rising above said support and provided with a plurality of holes, a lever pivotally connected to the post in any one of said holes whereby it may be vertically adjusted, a vertically-reciprocable knife, and an operative connection between said lever and knife.

5. A cheese-cutter, comprising a support for the cheese, a post and a guide rising above said support at diametrically opposite points, a diagonal brace connecting the upper ends of the post and guide, a slidable bar mounted in said guide and carrying a knife, and a lever pivotally connected to said post and operatively connected to said bar.

In testimony whereof I have signed my name in the presence of the subscribing witnesses.

ORSON W. SMITH.

Witnesses:
VERA E. WAGNER,
E. H. GREEN.